United States Patent
Fox et al.

(10) Patent No.: US 9,043,753 B2
(45) Date of Patent: May 26, 2015

(54) SYSTEM AND METHOD FOR RECOMMENDING SOFTWARE ARTIFACTS

(71) Applicant: Sonatype, Inc., Fulton, MD (US)

(72) Inventors: Brian Edward Fox, Goffstown, NH (US); Joel Orlina, Silver Spring, MD (US)

(73) Assignee: Sonatype, Inc., Fulton, MD (US)

( * ) Notice: Subject to any disclaimer, the term of this patent is extended or adjusted under 35 U.S.C. 154(b) by 0 days.

(21) Appl. No.: 14/078,151

(22) Filed: Nov. 12, 2013

(65) Prior Publication Data

US 2014/0075414 A1    Mar. 13, 2014

Related U.S. Application Data

(63) Continuation of application No. 13/151,816, filed on Jun. 2, 2011, now Pat. No. 8,612,936.

(51) Int. Cl.
*G06F 9/44*      (2006.01)

(52) U.S. Cl.
CPC ... *G06F 8/71* (2013.01); *G06F 8/36* (2013.01)

(58) Field of Classification Search
None
See application file for complete search history.

(56) References Cited

U.S. PATENT DOCUMENTS

| | | | |
|---|---|---|---|
| 5,615,400 A | 3/1997 | Cowsar et al. | |
| 6,167,535 A | 12/2000 | Foote et al. | |
| 6,282,698 B1 | 8/2001 | Baker et al. | |
| 6,931,544 B1 | 8/2005 | Kienhöfer et al. | |
| 7,080,355 B2 | 7/2006 | Carlson et al. | |
| 7,149,734 B2 | 12/2006 | Carlson et al. | |
| 7,159,206 B1 | 1/2007 | Sadhu et al. | |
| 7,234,131 B1 | 6/2007 | Speyrer et al. | |
| 7,322,024 B2 | 1/2008 | Carlson et al. | |
| 7,340,719 B1* | 3/2008 | Bakerman et al. | 717/106 |
| 7,343,386 B2 | 3/2008 | Gomes et al. | |
| 7,506,312 B1 | 3/2009 | Girolami-Rose et al. | |
| 7,631,294 B2* | 12/2009 | Rush et al. | 717/111 |
| 7,644,101 B2 | 1/2010 | Yano | |
| 7,707,162 B2 | 4/2010 | Naphade et al. | |

(Continued)

OTHER PUBLICATIONS

Bevan et al., "Facilitating Software Evolution Research with Kenyon," 2005, Proceedings of the 10th European software engineering conference held jointly with 13th ACM SIGSOFT international symposium on Foundations of software engineering, pp. 177-186.*

(Continued)

*Primary Examiner* — Thuy Dao
*Assistant Examiner* — Stephen Berman
(74) *Attorney, Agent, or Firm* — Posz Law Group, PLC

(57) ABSTRACT

A method for recommending at least one artifact to an artifact user is described. The method includes obtaining user characteristic information reflecting preferences, particular to the artifact user, as to a desired artifact. The method also includes obtaining first metadata about each of one or more candidate artifacts, and scoring, as one or more scored artifacts, each of the one or more candidate artifacts by evaluating one or more criteria, not particular to the artifact user, applied to the first metadata. The method further includes scaling, as one or more scaled artifacts, a score of each of the one or more scored artifacts, by evaluating the suitability of each of the one or more scored artifacts in view of the user characteristic information. The method lastly includes recommending to the artifact user at least one artifact from among the one or more scaled artifacts based on its scaled score.

18 Claims, 5 Drawing Sheets

(56) References Cited

U.S. PATENT DOCUMENTS

| | | | |
|---|---|---|---|
| 7,716,246 B2* | 5/2010 | Pepin | 707/791 |
| 7,735,068 B2 | 6/2010 | Siddaramappa et al. | |
| 7,788,632 B2 | 8/2010 | Kuester et al. | |
| 7,810,087 B2 | 10/2010 | O'Brien | |
| 7,814,078 B1 | 10/2010 | Forman et al. | |
| 7,844,592 B2 | 11/2010 | Shoval et al. | |
| 7,877,391 B2* | 1/2011 | Bird et al. | 707/748 |
| 7,958,494 B2 | 6/2011 | Chaar et al. | |
| 8,037,453 B1 | 10/2011 | Zawadzki | |
| 8,060,871 B2 | 11/2011 | Bernabeu-Auban et al. | |
| 8,069,182 B2 | 11/2011 | Pieper | |
| 8,104,018 B2 | 1/2012 | Chessell et al. | |
| 8,156,092 B2 | 4/2012 | Hewett et al. | |
| 8,156,120 B2* | 4/2012 | Brady | 707/736 |
| 8,161,470 B2 | 4/2012 | Bottomley et al. | |
| 8,280,755 B2 | 10/2012 | Stuhec et al. | |
| 8,296,251 B1 | 10/2012 | Athayde | |
| 8,327,318 B2 | 12/2012 | Chaar et al. | |
| 8,356,278 B2 | 1/2013 | Drissi et al. | |
| 8,359,285 B1 | 1/2013 | Dicker et al. | |
| 8,359,566 B2 | 1/2013 | Chaar et al. | |
| 8,359,571 B2 | 1/2013 | Clemm et al. | |
| 8,438,532 B2 | 5/2013 | Fox et al. | |
| 8,464,205 B2 | 6/2013 | Chaar et al. | |
| 8,473,894 B2 | 6/2013 | Fox et al. | |
| 8,479,159 B2 | 7/2013 | Klinger et al. | |
| 8,479,165 B1 | 7/2013 | Kawashima et al. | |
| 8,484,617 B2 | 7/2013 | Goh et al. | |
| 8,499,284 B2 | 7/2013 | Pich et al. | |
| 8,539,437 B2 | 9/2013 | Finlayson et al. | |
| 8,543,979 B2 | 9/2013 | Arcese et al. | |
| 8,572,550 B2 | 10/2013 | Fox et al. | |
| 8,612,936 B2 | 12/2013 | Fox et al. | |
| 8,627,270 B2 | 1/2014 | Fox et al. | |
| 8,656,343 B2 | 2/2014 | Fox et al. | |
| 8,739,121 B1* | 5/2014 | Jones et al. | 717/113 |
| 8,745,572 B2 | 6/2014 | Zimmermann et al. | |
| 8,875,090 B2 | 10/2014 | Fox et al. | |
| 2002/0049962 A1 | 4/2002 | Kelbaugh et al. | |
| 2003/0046282 A1 | 3/2003 | Carlson et al. | |
| 2004/0010786 A1 | 1/2004 | Cool et al. | |
| 2004/0039921 A1 | 2/2004 | Chuang | |
| 2004/0046785 A1 | 3/2004 | Keller | |
| 2004/0243968 A1 | 12/2004 | Hecksel | |
| 2005/0086473 A1 | 4/2005 | Barkley et al. | |
| 2005/0137884 A1 | 6/2005 | Baird | |
| 2005/0204340 A1* | 9/2005 | Ruminer et al. | 717/123 |
| 2005/0289066 A1 | 12/2005 | Weare | |
| 2006/0020937 A1 | 1/2006 | Schaefer | |
| 2006/0037000 A1 | 2/2006 | Speeter et al. | |
| 2006/0048097 A1 | 3/2006 | Doshi | |
| 2006/0149717 A1 | 7/2006 | Bird et al. | |
| 2006/0150153 A1 | 7/2006 | Altman | |
| 2006/0265688 A1 | 11/2006 | Carlson et al. | |
| 2007/0033567 A1 | 2/2007 | Carlson et al. | |
| 2007/0050232 A1 | 3/2007 | Chang et al. | |
| 2007/0089086 A1 | 4/2007 | Ortloff | |
| 2007/0143735 A1 | 6/2007 | Clemm et al. | |
| 2007/0250829 A1* | 10/2007 | Hillier et al. | 717/170 |
| 2007/0277148 A1 | 11/2007 | Venolia | |
| 2008/0028378 A1 | 1/2008 | Biswas et al. | |
| 2008/0127040 A1 | 5/2008 | Barcellona | |
| 2008/0154965 A1 | 6/2008 | Pedersen | |
| 2008/0229300 A1 | 9/2008 | O'Brien | |
| 2008/0235680 A1 | 9/2008 | Strauss et al. | |
| 2008/0263505 A1 | 10/2008 | StClair et al. | |
| 2008/0270374 A1 | 10/2008 | Li et al. | |
| 2008/0281904 A1 | 11/2008 | Conrad et al. | |
| 2008/0307267 A1 | 12/2008 | Chandrasekaran | |
| 2008/0313595 A1 | 12/2008 | Boulineau et al. | |
| 2009/0013310 A1 | 1/2009 | Arner et al. | |
| 2009/0055809 A1 | 2/2009 | Campbell | |
| 2009/0064114 A1 | 3/2009 | Bottomley et al. | |
| 2009/0094572 A1 | 4/2009 | Hegde et al. | |
| 2009/0119261 A1 | 5/2009 | Ismalon | |
| 2009/0133006 A1* | 5/2009 | Cheung | 717/144 |
| 2009/0138843 A1 | 5/2009 | Hinton et al. | |
| 2009/0144698 A1 | 6/2009 | Fanning et al. | |
| 2009/0282388 A1* | 11/2009 | Gawor et al. | 717/120 |
| 2009/0300404 A1 | 12/2009 | Branson et al. | |
| 2009/0307662 A1 | 12/2009 | Ackerman | |
| 2010/0023919 A1 | 1/2010 | Chaar et al. | |
| 2010/0023920 A1 | 1/2010 | Chaar et al. | |
| 2010/0058295 A1 | 3/2010 | Johnson et al. | |
| 2010/0063975 A1* | 3/2010 | Hayes | 707/765 |
| 2010/0100543 A1 | 4/2010 | Brady | |
| 2010/0153920 A1 | 6/2010 | Bonnet | |
| 2010/0211924 A1 | 8/2010 | Begel et al. | |
| 2010/0242015 A1* | 9/2010 | Stenberg et al. | 717/106 |
| 2010/0275180 A1* | 10/2010 | Alex | 717/106 |
| 2010/0306730 A9 | 12/2010 | Carlson et al. | |
| 2010/0333067 A1 | 12/2010 | Goh et al. | |
| 2011/0010685 A1 | 1/2011 | Sureka et al. | |
| 2011/0023016 A1 | 1/2011 | Khader et al. | |
| 2011/0055186 A1 | 3/2011 | Gopalakrishnan | |
| 2011/0066619 A1 | 3/2011 | Perantatos et al. | |
| 2011/0107301 A1 | 5/2011 | Chan et al. | |
| 2011/0137807 A1 | 6/2011 | Cha | |
| 2011/0145810 A1 | 6/2011 | Forsyth | |
| 2011/0197175 A1* | 8/2011 | Bouz et al. | 717/107 |
| 2011/0258162 A1 | 10/2011 | Lam | |
| 2011/0289098 A1 | 11/2011 | Oztaskent et al. | |
| 2011/0296396 A1 | 12/2011 | Kurtakov | |
| 2011/0307862 A1 | 12/2011 | Abrams et al. | |
| 2011/0314438 A1 | 12/2011 | Surazski et al. | |
| 2012/0060148 A1 | 3/2012 | Jones et al. | |
| 2012/0110039 A1 | 5/2012 | McKay et al. | |
| 2012/0124547 A1 | 5/2012 | Halbedel | |
| 2012/0144363 A1 | 6/2012 | Bernardini et al. | |
| 2012/0159420 A1 | 6/2012 | Yassin et al. | |
| 2012/0246616 A1 | 9/2012 | Frontiero et al. | |
| 2012/0272205 A1 | 10/2012 | Fox et al. | |
| 2012/0311534 A1 | 12/2012 | Fox et al. | |
| 2012/0317546 A1 | 12/2012 | Arcese et al. | |
| 2012/0324419 A1 | 12/2012 | Roberts et al. | |
| 2012/0331439 A1 | 12/2012 | Zimmermann et al. | |
| 2012/0331447 A1 | 12/2012 | Nayak et al. | |
| 2013/0007704 A1 | 1/2013 | Haynes et al. | |
| 2013/0047137 A1 | 2/2013 | Bak et al. | |
| 2013/0067426 A1 | 3/2013 | Fox et al. | |
| 2013/0067427 A1 | 3/2013 | Fox et al. | |
| 2013/0074038 A1 | 3/2013 | Fox et al. | |
| 2013/0174122 A1* | 7/2013 | Watters et al. | 717/121 |
| 2013/0191808 A1 | 7/2013 | Fox et al. | |
| 2013/0212562 A1 | 8/2013 | Fox et al. | |
| 2013/0227517 A1 | 8/2013 | Fox et al. | |
| 2013/0311496 A1 | 11/2013 | Fedorenko et al. | |
| 2013/0326469 A1 | 12/2013 | Fox et al. | |
| 2014/0026121 A1 | 1/2014 | Jackson et al. | |
| 2014/0101633 A1 | 4/2014 | Fox et al. | |
| 2014/0115562 A1 | 4/2014 | Fox et al. | |
| 2014/0207753 A1 | 7/2014 | Fox et al. | |

OTHER PUBLICATIONS

Dossick et al., "CHIME: a metadata-based distributed software development environment," 1999, Proceedings of the 7th European software engineering conference held jointly with the 7th ACM SIGSOFT international symposium on Foundations of software engineering, pp. 464-475.*

Andric et al., "Assisting artifact retrieval in software engineering projects," 2004, Proceedings of the 2004 ACM symposium on Document engineering, pp. 48-50.*

Notice of Allowance issued by the U.S. Patent Office on Jul. 9, 2014 in related U.S. Appl. No. 13/861,065.

Froehlich et al., "Unifying Artifacts and Activities in a Visual Tool for Distributed Software Development Teams," 2004, Proceedings of the 26th International Conference on Software Engineering, pp. 387-396.

U.S. Appl. No. 14/271,648, filed May 7, 2014, Fedorenko.

Grundy et al., "Inconsistency management for multiple-view software development environments," 1998, IEEE Transactions on Software Engineering, vol. 24, Issue: 11, pp. 960-981.

(56) References Cited

OTHER PUBLICATIONS

Han, "Supporting impact analysis and change propagation in software engineering environments," 1997, Proceedings Eight IEEE International Workshop on Software Technology and Engineering Practice incorporating Computer Aided Software Engineering, pp. 172-182.
U.S. Appl. No. 14/140,167, filed Dec. 24, 2013, Fox et al.
Final Office Action issued by the U.S. Patent Office on Feb. 25, 2014 in connection with related U.S. Appl. No. 13/554,335.
Office Action issued by the U.S. Patent Office on Mar. 10, 2014 in connection with related U.S. Appl. No. 13/233,265.
Notice of Allowance issued by the U.S. Patent Office on Mar. 20, 2014 in related U.S. Appl. No. 13/476,160.
Gall et al., "Visualizing software release histories: the use of color and third dimension," IEEE International Conference on Software Maintenance, 1999 (ICSM '99) Proceedings, pp. 99-108.
Siobhan Clark et al., "Verifying components under development at the design stage: A Tool to support the composition of component design models", 1998, Google, 3 pages.
Mili et al., "Storing and Retrieving Software Components: A Refinement Based System", 1994, IEEE, 91-100.
U.S. Appl. No. 13/554,335, filed Jul. 20, 2102, Jackson et al.
U.S. Appl. No. 13/744,542, filed Jan. 18, 2013, Fox et al.
U.S. Appl. No. 14/102,713, filed Dec. 11, 2013, Fox et al.
Sourceforge, List of Current OSS Discovery Fingerprints [online] [retrieved on May 27, 2012] Retrieved from the internet: <http://ossdiscovery.sourceforge.net/fingerprings.html>.
Sourceforge, OSS Discovery FAQ [online] [retrieved on May 27, 2012] Retrieved from the internet: <http://ossdiscovery.sourceforge.net/faq.html>.
Cubranic et al., "Hipikat: Recommending Pertinent Software Development Artifacts," 2003, Proceedings of the 25$^{th}$ International Conference on Software Engineering (ICSE '03), pp. 1-11.
Cubranic et al., "Hipikat: A Project Memory for Software Development," IEEE Transactions on Software Engineering, vol. 31, No. 6, Jun. 2005, pp. 446-465.
Milanovic et al., "Model & Metamodel, Metadata and Document Repository for Software and Data Integration", 2008, MoDELS 2008, LNCS 5301, pp. 416-430, 2008.
Sherman, "A Process-Oriented Ontology for Representing Software Engineering Project Knowledge", 2009, A doctoral dissertation submitted in partial fulfillment of the requirements for the degree of Doctor of Philosophy, Graduate School of Computer and Information Sciences, Nova Southeastern University, pp. 1-244.
Ji et al., "Efficient Interactive Fuzzy Keyword Search", WWW 2009, Apr. 20-24, 2009, ACM 978-1-60558-487-4/09/04, pp. 371-380.
Happel et al., Potentials and Challenges of Recommendation Systems for Software Development, RSSE '08, Copyright 2008 ACM 978-1-60558-228-3, pp. 11-15.
Maalej et al., "A Lightweight Approach for Knowledge Sharing in Distributed Software Teams", T. Yamaguchi (Ed.): PAKM 2008, LNAI 5345, pp. 14-25.
Gardler, "Reuse Readiness Rating", 2009, pp. 1-17, downloaded from the Internet on Apr. 1, 2013 from <url>:http://www.oss-watch.ac.uk/resources/reuseReadinessRating.
Open Source Initiative, "Home", May 5, 2010, pp. 1-2, downloaded from the Waybackmachine Internet Archive on Apr. 1, 2013.
Notice of Allowance issued by the U.S. Patent Office on Jan. 22, 2013 in connection with related U.S. Appl. No. 13/089,751.
Notice of Allowance issued by the U.S. Patent Office on Mar. 15, 2013 in connection with related U.S. Appl. No. 13/483,412.
Office Action issued by the U.S. Patent Office on Apr. 8, 2013 in connection with related U.S. Appl. No. 13/151,816.
Office Action issued by the U.S. Patent Office on Apr. 9, 2013 in connection with related U.S. Appl. No. 13/231,162.
Gacek, "Exploiting Domain Architectures in Software Reuse", 1992, ACM 0-89791-739-1/95/0004, pp. 229-232.
Prieto-Diaz et al., "Classifying Software for Reusability", Jan. 1987, IEEE Software pp. 6-16.
Meling et al., "Storing and Retrieving Software Components: A Component Description Manager", 2000, IEE, pp. 1-11.
Robillard et al., "Recommendation Systems for Software Engineering", IEEE Computer Society, 2010, pp. 80-86.
Duan et al., "Clustering Support for Automated Tracing", ASE '07, Nov. 5-9, 2007, pp. 244-253.
David, "Recommending Software Artifacts from Repository Transactions", IEA/AIE '08 Proceedings of the 21$^{st}$ International conference on Industrial, Engineering and Other Applications of Applied Intelligent Systems: New Frontiers in Applied Artificial Intelligence, 2008, pp. 189-198.
Herbsleb, "Global Software Engineering: The Future of Socio-technical Coordination," 2007, FOSE '07 2007 Future of Software Engineering, pp. 188-198.
Kagdi et al., "A survey and taxonomy of approaches for mining software repositories in the context of software evolution," 2007, Journal of Software Maintenance and Evolution: Reseach and Practice. J. Soft. Maint. Evol.: Res. Pract. 2007; 19:77-131.
Office Action issued by the U.S. Patent Office on Jun. 18, 2013 in related U.S. Appl. No. 13/369,617.
Notice of Allowance issued by the U.S. Patent Office on Jul. 11, 2013 in related U.S. Appl. No. 13/780,525.
Notice of Allowance issued by the U.S. Patent Office on Aug. 14, 2013 in related U.S. Appl. No. 13/151,816.
Notice of Allowance issued by the U.S. Patent Office on Sep. 9, 2013 in related U.S. Appl. No. 13/231,162.
Office Action issued by the U.S. Patent Office on Sep. 24, 2013 in connection with related U.S. Appl. No. 13/476,160.
Office Action issued by the U.S. Patent Office on Oct. 2, 2013 in connection with related U.S. Appl. No. 13/554,335.
Google, classpath-explorer Library which allows discovering classes at runtime, 2008. p. 1, downloaded from the Wayback Machine Internet Archive Sep. 25, 2013.
Cook et al., "An Extensible Framework for Collaborative Software Engineering", 2003, Proceedings of the Tenth Asia-Pacific Software Engineering Conference (APSEC'03), pp. 1-10.
Fitzpatrick et al., "CVS Integration with Notification and Chat: Lightweight Software Team Collaboration," CSCW'06, Nov. 4-8, 2006. pp. 49-58.
Cleland-Huang et al., "Event-Based Traceability for Managing Evolutionary Change," IEEE Transactions on Software Engineering, vol. 29, No. 9, Sep. 2003, pp. 796-810.
Notice of Allowance issued by the U.S. Patent Office on Oct. 4, 2013 in related U.S. Appl. No. 13/369,617.
The International Search Report and The Written Opinion of the International Searching Authority mailed on Oct. 15, 2013 by the International Searching Authority in connection with international application No. PCT/US2013/041785, which corresponds to related U.S. Appl. No. 13,476,160.
Dmitriev. Safe Class and Data Evolution in Large and Long-Lived Java Applications. Mar. 2001. [retrieved on 2013-26] Retrieved from the Internet: <URL:http://citeseerx.ist.psu.edu/viewdoc/download-?doi+10.1.1.6.1812&rep+rep1&type=pdf>, entire document.
Chilowicz et al. Syntax tree fingerprinting: a foundation for source code similarity detection. Sep. 29, 2011. [Retrieved on 2013-26]. Retrieved from the Internet: <URL: http://hal-upec-mlv.archives-ouvertest.fr/docs/00/62/78/11/PDF/HAL.pdf>, entire document.
Office Action issued by the U.S. Patent Office on Oct. 1, 2014 in connection with related U.S. Appl. No. 13/554,335.
Office Action issued by the U.S. Patent Office on Oct. 22, 2014 in connection with related U.S. Appl. No. 13/962,122.
Office Action issued by the U.S. Patent Office on Oct. 23, 2014 in related U.S. Appl. No. 13/233,265.
Office Action issued by the U.S. Patent Office on Nov. 26, 2014 in related U.S. Appl. No. 14/102,713.
International Preliminary Report on Patentability issued by the International Bureau of WIPO on Dec. 4, 2014 in related International application No. PCT/US2013/041785.

* cited by examiner

FIG. 4

ARTIFACT RECOMMENDATION USER PROFILE FORM

400

401 — 1. Please enter your name:
402 —

403 — 2. Are you a developer, technical architect, line coder development lead, development manager, or chief officer ? Y) ____ N) ____
404 — 2a. If yes, please enter your title:          — 415

405 — 3. Please enter the organization that you are affiliated with:
406 —

407 — 4. Please describe where additional information about your organization can electronically be found:
408 —

409 — 5. Please describe any projects with which you or your organization are associated:
410 —

411 — 6. Please enter pertinent preferences as to a desired artifact:

412a — Industry                412b — Geographic Location

412c — Download Frequency      412d — Update Frequency

412e — Preferred sponsors      412f — Preferred Contributors

412g — Preferred licenses      412h — Preferred security

413 — 7. Would you like to have preferences inferred from data mined from disclosed projects and other information sources found electronically? Y) _____ N) _____

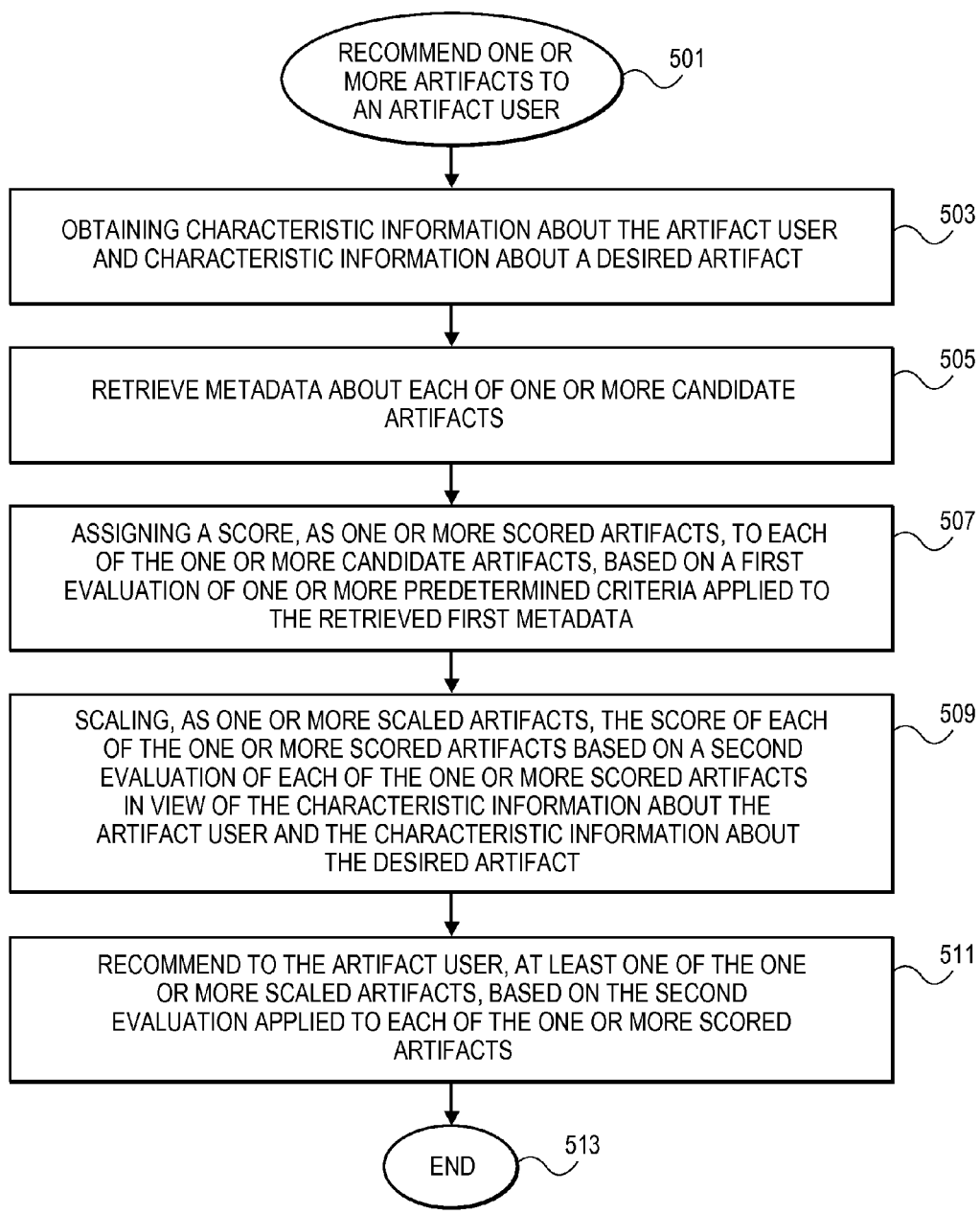

SYSTEM AND METHOD FOR RECOMMENDING SOFTWARE ARTIFACTS

CROSS-REFERENCE TO RELATED APPLICATIONS

This application is a continuation of U.S. patent application Ser. No. 13/151,816 (now U.S. Pat. No. 8,612,936), filed Jun. 2, 2011, which is expressly incorporated herein by reference.

TECHNICAL FIELD

The technical field relates in general to software development, and more specifically to systems for recommending software artifacts used to facilitate software development.

BACKGROUND

All software developers, in whatever language and platform, and whatever methodology, realize that there is some software that they don't want to write and that already exists. Developers that write their own software conventionally will use published artifacts as building blocks in writing code within a larger project, so as to avoid re-writing software that already exists. For any given task, there may be multiple artifacts that already exist that can possibly do what the programmer/developer needs to do.

However, locating an appropriate existing artifact for a particular project can be difficult. A software artifact that is appropriate for one project may not be particularly appropriate for the same use in another project. Further, there may be multiple artifacts that are appropriate for a particular project but to a varying degree. Determining which of many artifacts are most appropriate can be challenging.

SUMMARY

Accordingly, one or more embodiments provide a method, implemented in a computer, for recommending at least one artifact to an artifact user. The method comprises obtaining, by the computer, user characteristic information reflecting preferences, particular to the artifact user, as to a desired artifact. The method further comprises obtaining, by the computer, first metadata about each of one or more candidate artifacts. The method also comprises scoring, by the computer, as one or more scored artifacts, each of the one or more candidate artifacts by evaluating one or more criteria, not particular to the artifact user, applied to the first metadata. The method further comprises scaling, by the computer, as one or more scaled artifacts, a score of each of the one or more scored artifacts, by evaluating the suitability of each of the one or more scored artifacts in view of the user characteristic information. The method lastly comprises recommending, by the computer, to the artifact user at least one artifact from among the one or more scaled artifacts based on a scaled score of the least one artifact.

Another embodiment is a non-transitory computer-readable medium comprising instructions for execution by a computer. The instructions include the method described above for recommending at least one artifact to an artifact user. A third embodiment is a computer system configured for recommending at least one artifact to an artifact user. The system comprises a transceiver and a processor. The transceiver is operable to transmit and receive communications over at least a portion of a network. The process is cooperatively operable with the transceiver. The processor is configured to facilitate the steps of the method described above for recommending at least one artifact to an artifact user.

BRIEF DESCRIPTION OF THE DRAWINGS

The accompanying figures, where like reference numerals refer to identical or functionally similar elements and which together with the detailed description below are incorporated in and form part of the specification, serve to further illustrate various exemplary embodiments and to explain various principles and advantages in accordance with the embodiments.

FIG. 4 is a diagram illustrating an artifact recommendation user profile from that is used to obtain characteristic information about an artifact user and characteristic information about a desired artifact.

FIG. 5 is a flow chart illustrating a process for recommending one or more recommended artifacts to an artifact user.

DETAILED DESCRIPTION

Figure 1:
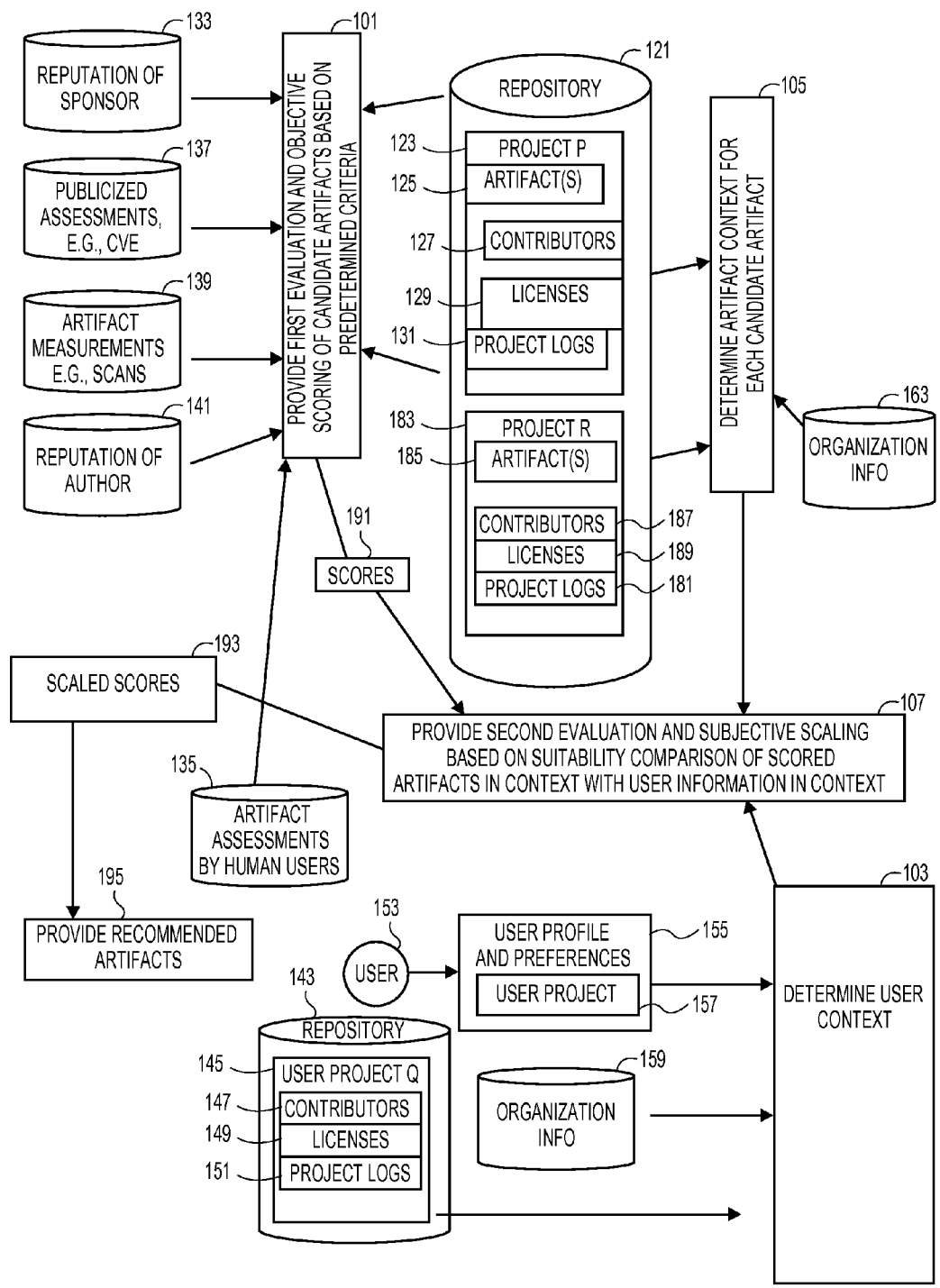
FIG. 1 is a data flow diagram illustrating recommending one or more recommended artifacts to an artifact user.

In overview, the present disclosure concerns software development, in which software code building blocks, sometimes referred to as binary or source code, have been published after a formal process of vetting and then being released for use as one of plural building blocks to be used in a complete piece of software. Such software development includes utilizing build management tools, for example that assist in controlling the software artifacts that are selected and/or are used in a project. Various inventive concepts and principles of the present application are embodied in systems, devices, and methods therein for recommending one or more recommended software artifacts based on both on objective qualities of candidate artifacts and based on subjective characteristic of the artifact user (for example, what industry is the artifact user in) and subjective characteristic of a desired artifact (for example, in what particular software development effort will the artifact be used and for what purpose).

The instant disclosure is provided to further explain in an enabling fashion the best modes of performing one or more embodiments. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms such as first and second, and the like, if any, are used solely to distinguish one from another entity, item, or action without necessarily requiring or implying any actual such relationship or order between such entities, items or actions. It is noted that some embodiments may include a plurality of processes or steps, which can be performed in any order, unless expressly and necessarily limited to a particular order; i.e., processes or steps that are not so limited may be performed in any order.

Much of the inventive functionality and many of the inventive principles when implemented, are best supported with or in software or integrated circuits (ICs), such as a digital signal processor and software therefore, and/or application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions or ICs with minimal experimentation. Therefore, in the interest of brevity and minimization of any risk of obscuring principles and concepts, further discussion of such software and ICs, if any, will be limited to the essentials with respect to the principles and concepts used by the exemplary embodiments.

DEFINITIONS

The claims use the following terms which are defined to have the following meanings for the purpose of the claims herein.

The terms "artifact" or "software artifact" or "software build artifact" used herein is defined to be a specific version of an existing reusable software code building block, which is binary or source code, that has been published, for example as referred to in the open source model, to a publicly available repository, such that it was vetted, approved, indexed so it can be located, and formally released to the public, but is not a complete stand-alone finished product. The term "artifact", "software artifact" or "software build artifact" is not used herein in the broad sense. A concrete example of an artifact is something like, e.g., Hibernate_3, which is an object-relational mapper which allows the JAVA developer to interact with relational database as if using native object oriented code. Its Group ID is org.hibernate, its artifact ID is artifact-core, its version is 3.0. Less formally, the artifact can be understood to be a bit of code which a developer does not wish to write himself/herself and so the developer uses an artifact which is published in a repository. In the MAVEN world, for example, there is a known pre-defined process for publishing an artifact to the MAVEN central web-site or other publicly available repository.

The terms "computer system" or "computer" used herein denotes a device sometimes referred to as a computer, laptop, personal computer, personal digital assistant, notebook computer, personal assignment pad, server, client, mainframe computer, variations and equivalents thereof.

The term "metadata" is defined to be data that describes the content and context of a file with which it is associated. Metadata that is associated with a software artifact can indicate a project to which the artifact belongs, a security of the artifact or a license that is associated with the artifact, among other things.

"Open source" software is defined herein to be source code that allows distribution as source code as well as in compiled form, with a well-publicized and indexed means of obtaining the source, optionally with a license that allows modifications and derived works.

The term "Open Source Definition" is used herein to mean the Open Source Definition available from the Open Source Initiative, variations and evolutions thereof.

The term "project" is used herein to indicate a pre-defined collection of related software artifacts which a group of users maintains; a project can be uniquely identified by a group ID, artifact ID, and version number. A project has a unique project name, a URL specific to the project, and a sponsoring organization; a project tracks its activity including logging when an artifact in the project is used or updated and the unique identity of the user that used or updated the artifact. Examples of projects include the Mozilla Foundation (sponsoring organization) which maintains the Firefox (project name) web browser, the Eclipse Foundation which maintains the M2Eclipse software, the Apache Software Foundation which maintains Maven, as well as private companies such as Sonatype that maintain their projects such as Sonatype Professional. A project can be a parent or child of another project, in which case the child can inherit group ID, version number, developers and contributors, plugin lists, report lists, plugin executions, and plugin configuration from the parent.

The terms "repository" or "software repository" used herein are defined to mean an electronic storage system that stores software build artifacts and dependencies for later retrieval, to which artifacts are published in accordance with procedures which are well known to those in the field, so that artifacts made by one software developer are published to be available for further use by other software developers, to be incorporated as building blocks to build software products which can be executed; a repository can include a computer server by which the stored electronic copies of artifacts are made available for use by software developers to be incorporated as building blocks to build software products which can be executed; the repository has a unique identifier that indicates the software developer (an individual or a group) that contributed the artifact. A repository can be remote or local.

The term "software build" used herein specifically is defined to mean a process as pre-defined in an executable build program of converting a plurality of artifacts obtained from a repository and combining the results into an executable stand-alone computer program or a software artifact for use in a further software build, including at least compiling artifacts and linking compiled artifacts and possibly binary artifacts from the repository, in a pre-determined order as defined in the build program.

The term "user" is defined herein specifically to be a software developer, a line coder, a technical architect, a development lead, or a development manager who is running a team of one or more developers, any of which are working on a software deliverable; or a C-level individual (CIO, CSO, and the like); or an individual that sets or enforces governing standards for software deliverables such as for vulnerability or licensing or artifacts. The term "user" is not used herein in the broad, common sense. The user can be management level because management can have final veto power over the software components in the software deliverable resulting from a project. Typically, but not always, an individual developer will not have the final say over which artifacts are approved.

The term "subjective," for example as used in the expressions "subjective evaluation", "subjective characteristics", and "subjective qualities", is defined herein as simply being related to a particular user.

The term "objective", for example as used in the expressions "objective evaluation", "objective characteristics", and "objective criteria" is defined herein as not being related to a particular user; that is, being independent of any particular user.

<End of Definitions>

Software project developers face a problem of making sense of the giant jumble that is open source software. Finding a best artifact for their purposes among this giant jumble of available artifacts is difficult. The system described herein, which aids developers, is applicable to any field of software development, so long as information is available from which a source or categorization of possible artifacts can be derived.

Concerns of software developers in selecting artifacts can include the following questions: Functionality—does an available artifact do more than an artifact I have now? Does an artifact do exactly what I need it to do? Security—will the artifact perform without being hacked? Applicability—will the artifact perform for my intended audience? Is this an artifact that is in use by my peers, i.e., other people in my industry (which suggests a higher degree of trust and applicability for the intended goal)?

A concrete example of such concerns is open source artifacts that are primarily, but not necessarily written in Java. There are hundreds of thousands of artifacts from which a developer can choose, but conventionally there is no set of guideposts to drive a user down a path of proper discovery, beyond traditional searching such as Google searches. Current techniques provide no scoring of artifacts, no ranking, and no set of key terms which are descriptive of one set of artifacts over another. There are no systematic sources of evaluations and/or recommendation related to what would be an appropriate artifact for a particular software development project.

Conventionally, the process of building an executable computer program from software artifacts can be managed by a build tool, which is a computer program that coordinates and controls other programs to compile and link the various files which together comprise the executable computer program, in the correct order. A build tool can include preprocessing, compilation, linking, packaging, testing, and ultimate distribution of the executable computer program. A project management tool can provide a superset of features found in a build tool, and can facilitate communication among members of a working team. Examples of build tools and project management tools are Maven available from Sonatype Inc. or Apache Software Foundation ("Apache"), Apache Ant available from Apache, Buildr available from Apache, Gradle available from Gradle Inc., Apache Ivy, and the like, variations and evolutions thereof. It is assumed that one of skill in this field is generally familiar with "Maven: The Complete Reference" (2010) published by Sonatype, Inc. Mountain View, Calif. which further describes some basic concepts.

As further discussed herein below, various inventive principles and combinations thereof are advantageously employed to help developers that are writing their own software obtain evaluations and recommendations as to which artifact or artifacts would be appropriate for each particular developer and for each particular project for that developer.

In accordance with exemplary embodiments, systems and methods are provided wherein predetermined criteria are applied in objectively scoring candidate artifacts based on quality, industry, community standards compliance, etc. The actual mechanism for applying the criteria is a machine-driven ingestion of metadata related to the candidate artifacts that is obtained from repositories and known projects. For example, metadata that is associated with the candidate artifacts about the activity of the respective projects to which the artifacts belongs can be collected, along with security associated with each artifact, or licensing associated with each artifact. The scoring of the candidate artifacts is then based on the collected metadata.

Objectively scored artifacts (which have been scored without regard to any characteristics of the user) can be compared for suitability with an intended use of the artifact by the user, so as to provide subjectively scaled scores of artifacts specific to the user. As a result of this process, sometimes a single artifact will be scaled differently, for users in different projects with different intended uses. Once scored candidate artifacts are scaled for a particular user and for an intended use, a recommendation that list the highest scoring artifacts can be provided to the user for the user's consideration. In summary, a system and method for recommending artifacts can be based on an objection evaluation of candidate artifacts according to predefine criteria that results in a first score for each candidate artifact, and also based on a subjective evaluation of the candidate artifact in view of the intended user and in view of the intended use that results in a scaled score of each candidate artifact. A recommendation of the highest scoring artifacts can be made to the user. It should be noted that while the above discussion seems to emphasize that objective scores based on predetermined criteria are subjectively scaled according to user characteristics, other embodiments would consider that subjective scoring could be scaled based on objective considerations. That is to say, a common feature of all embodiments disclosed herein is that both objective and subjective factors are used in an eventual scoring of candidate artifacts that leads to eventual recommendations to a user.

Referring now to FIG. 1, a data flow diagram illustrating recommending one or more recommended artifacts to an artifact user will be discussed and described. In overview, FIG. 1 illustrates that data flows into a process to provide 101 a first evaluation and objective scoring of candidate artifacts based on predetermined criteria; data flows into a process to determine 103 user context from a user project, user profile, and user organization information, and the like; data flows into a process to determine 105 an artifact context for each candidate artifact from each candidate artifact's project, organization information, evaluator's organization information, and the like. Data also flows from determination of a user context 103, determination of each candidate artifact's context 105, to provide 107 a second evaluation and subjective scaling based on a suitability comparison of scored artifacts in context with user information in context. The scaled scores 193 thus reflect that scores 191 obtained from the objective evaluations 101 are scaled by the suitability comparisons 107, given the intended user and intended uses of a desired artifact.

Because the generated scaled scores take into account the user's subjective intended use (as input by the user and/or as determined by automated selection of information specifically relevant to the user's project), an artifact with a higher score reliably will be more appropriate for incorporation into the user's project than artifacts with a lower score. Without the above mentioned data flow and suitability determination, objectively scored software artifacts that are ranked highly, but that are not suitable for the user's project, could unfortunately be presented to, and selected by, the user. Meanwhile, a more suitable software artifact, which might be scaled to a higher score, may be overlooked.

Once scaled scores 193 are obtained, artifacts can be recommended based on the highest scaled scores. That is to say, the user can be provided with a list of artifacts having a scaled score that exceeds a particular threshold. Additionally, it is contemplated that artifacts whose scores are within a certain top percentile (say 25%) of all scaled artifacts will be recommended to a user for selection. Finally, it is even considered that a single highest score might be recommended to a user Illustrated in FIG. 1 are a repository 121 with Project P 123 and Project R 183, a reputation of sponsor database 133, one or more artifact assessments by humans databases 135, a publicized assessments database 137, an artifact measurements database 139, and a reputation of author database 141. The projects 123, 183 includes one or more artifacts 125, 185, lists of contributors 127, 187 of the artifacts, associated license(s) 129, 189 to which the artifacts in the projects are subject, and project logs 131, 181. The project logs 131, 181 can track, for example, source code controls (e.g., log in, check-in, check-out, update, etc.) and/or project issue tracking logs, as is known in the art.

Also illustrated in FIG. 1 are a user 153, who provides information comprising a user profile 155 with preferences of the user, and one or more organization information databases 159. The user profile 155 can include an indication 157 of a user project. In this example, the user project indication 157 relates to user project Q 145. In FIG. 1 is illustrated another repository 143 with the user project Q 145, contributors 147 to the project, licenses 149 associated with the project, and project logs 151.

As mentioned above, a software developer, such as user 153, wants to be able to use software modules/components (artifacts) that someone else has made publicly available, such as in one or more repositories 121 of one or more projects 123, 183. If the artifacts are open source, they are conventionally free to use. The developer wants to determine which of the artifacts of a particular type they want to use based on objective information about the quality of that artifact as well as other subjective information such as who else might be using that artifact in their same industry or similar types of industry. "Similar type of industry" considerations may be a subjective measure of the value of a candidate artifact.

As an example of "similar type of industry" consideration, a user who is a software developer in banking may want to know if someone else in banking or finance uses an artifact under consideration. As another example, a developer of a Fortune 1000 company wants to know whether other Fortune 1000 companies use the same module. As another example of a "similar type of industry" consideration, a developer in a regulated industry such as pharmaceuticals will be interested whether other developers in an industry under the same type of regulations are using the artifact. An artifact previously used by software developers in a similar industry or working in a similar type of company will give the user more confidence that an artifact is suitable if the same artifact has been used by an unknown start-up company or a different type of company or in a different industry.

Other subjective consideration in selecting a software artifact can be compliance with other user-defined criteria. For example, a developer may indicate that they only want to use artifacts that are widely used in their same geography (e.g., Europe or Germany; or in the U.S. or Mexico), or to only use artifacts that get a certain quality score level from user reviews, e.g., 3 or 4 star or better. It should be noted that user reviews of quality may be considered an objective evaluation of an artifact (that is an evaluation unrelated to a particular user); however when particular levels of quality are indicated as a preference of a user, user reviews can also be a subjective evaluation tool.

Furthermore, a user may want to have some other set of metrics they can use to subjectively score of an artifact so the user can decide whether or not they want to use that artifact. For example, a particular artifact may be understood to have few security issues, and may be considered to be of good quality, a developer working on an extremely sensitive application, such as an air safety application will need an artifact that is characterized by exceptionally high security and exceptionally high quality.

Generally speaking, quality of an artifact is an objective consideration in an evaluation of an artifact. Quality of an artifact can be measured, for example, based on other users' feedback, reported bugs, compatibility with prior versions, and an inferred level of quality based on the number of committers. Of course there are other objective indicators useful in scoring an artifact and these are discussed further below. However, as indicated by the above data flow diagram, a system for recommending one or more artifact requires (1) collecting objective data (such as how many users are using the artifact and artifact quality) and (2) obtaining through a user interface characteristic information related to the user (such as which projects the user intends to the user the artifact in), and characteristic information related to a desired artifact (such as increased levels of security, particular geographic region, etc).

In overview, metadata that embodiments of the present application utilize, of which a simplified representation is provided for example in FIG. 1, conveniently can be divided into three categories: (1) derived data, (2) community/contributed data, and (3) third party data. Derived data is data which is collected about activity of the artifacts. Derived data can be, for example, conventional logs of which artifacts are downloaded from the project to users. These logs 131,181 in the projects 123,183 can be analyzed to determine, for example, how frequently the artifact is downloaded, to what geographic regions the artifact is downloaded (using a known technique), to what company the artifact is being downloaded to (by performing known reverse DNF lookups to figure out the actual companies who are doing the downloading and from that, determine their industry and size from an automatically or manually produced list or from organization information 159, 163).

As a concrete example of derived data, project activity may be directly derived or inferred from the source code control mechanism (SCM) associated with the project as well as the issue tracking systems that may be associated with the project. Also, projects conventionally collect information on how frequently an artifact is updated (reflected in the project logs 131, 181), who the committers are who contributed the artifact (as listed in the contributors 127, 187), and what else the committers have contributed (obtained by reviewing contributors 127, 187 lists in other projects). As is known in the art, a conmmitter typically digitally signs the contributed artifact so that the contributors' 127, 187 information is highly reliable.

Community/contributed data can include, for example, reviews, scores, ranking, categorization, and tagging. This type of data may be provided by users, for example, as artifact assessments by human users 135. An example of a similar type of assessment in a slightly different environment would be a review process provided by, for example, Amazon.com, Netflix.com, and other web sites where products/services are assessed. Even more complex associations can be discovered from analysis of contributed data such as, "users who use artifact X tend to use artifact Y."

Third party data can be information pulled in from other sources and can be approximately matched to artifacts or information in the project about the artifacts. For example, data on artifact licenses can be obtained from a company that provides that type of information based on the licenses 129, 189 associated with the artifacts. Data on security of the artifact can be obtained from NIST logs. Vulnerability information and quality information can be obtained from the project logs 131, 181 themselves. In FIG. 1, the third party data is represented as publicized assessments, e.g., CVE 137 (common vulnerabilities and exposures information conventionally available from Mitre Corporation).

Typically there is not a one-to-one correspondence between the third party data and a particular artifact. Since the convention of project group/artifact/version is used for the convenience of programmers and is generally not known to persons that ultimately use the final software product, the third party data does not refer to the project group/artifact/version. Therefore, the identity of the artifact or artifacts to which the third party data actually is relevant must be resolved (manually or by developing and referring to a list) against the identity of the software indicated in the third party data. For example, if the artifact comes from project FOO, the artifact name and number must be reconciled against the logs for that artifact name and number at project FOO.

The process to provide 101 a first evaluation and objective scoring of candidate artifacts based on predetermined criteria can obtain derived data about the artifacts 125, 185 from the names of contributors 127, 187 of the artifacts, licenses 129, 189 of the projects 123, 183, and project logs 131, 181 which indicate how often and how recently the artifact is updated. The process 101 can input community/contributed data, such as the artifact assessments by human users 135 indicating assessment by the human users. The process 101 can also input third party data such as publicized evaluations, e.g., a CVE 137, and can resolve the third party data software name and release (e.g., Microsoft 2007 1.0) to the project group/artifact/version. Optionally, the reputations of the contributor organization sponsor 133 and author 141 (such as determined by user reviews or as indicated by critics in trade journals) can be further input into the process 101. This information can be collectively evaluated to provide an objective score. Again, the score is referred to as objective because it is made without considering the user or the intended use. Various techniques are known for collecting rankings and evaluations, weighting the information, increasing/decreasing weightings and the like, and any desired technique can be used herein.

The process to determine 103 the user context may use the user profile 155 that is obtained from the user 153. The process 103 will also use the user project Q 145, and user organization information 159 and the like to further develop the context of the user. As described further below, the user profile 155 may be input from the user to determine their subject preferences for candidate artifacts, such as how recently used an artifact should be, minimum or maximum frequency of downloading and/or updating of an artifact, preferred contributors of an artifact, preferred sponsors of an artifact, standards for reputation of sponsor or author, minimum or maximum versions of an artifact, preferred licenses for an artifact, unacceptable licenses for an artifact, source code language, geographic requirements, industry requirements, security requirements, and the like. The user profile will preferably indicate the user project 157, which points to a particular user project Q 145, from which are obtained the contributors 147 and licenses 149. Any artifacts eventually selected by the user from the recommended artifacts provided to the user will also become part of user project Q 145.

The organization of the user can be obtained via input from the user through the user profile or from the user's e-mail address, IP address, and/or from the sponsor as reflected in the user project Q 145. Once the user's organization is known, information about the user's organization can be obtained from the organization information 159, such as geographic location, organization size, organization industry, organization regulations, public/private organization, and the like. Of course, the user can additionally provide this information via the user profile 155 as well.

The process to determine 105 a candidate artifact context for each candidate artifact may use information from the artifacts' project 123, 183; the artifacts' contributors 127, 187; the licenses 129, 189 of the projects 123, 183; the projects' logs 131, 181 of the artifacts' projects 121, 181; the artifacts' projects' organization information 163, the artifacts' contributors' organization information 163; and (although not indicated in FIG. 1 by directional arrows) any of the reputation of sponsors 133, publicized assessments 137, reputations of artifacts' evaluator and authors 141, and artifacts' measurements 139 that may be relevant to obtaining the context of each of the candidate artifacts 125, 185. It should be noted that data related to the candidate artifacts' organizations may be obtained as explained above from the contributors' e-mail addresses, IP addresses, and/or from the sponsors as reflected in the artifacts' projects 123, 183. Then, information about the artifacts' sponsors' and/or contributors' organizations can also be further obtained from the organization information 163, including data such as geographic location, organization size, organization industry, organization regulations, public/private organization, and the like.

The information from the determination of user context 103 and the determination of artifacts' contexts 105 may be used for providing 107 a second evaluation and subjective scaling of the scores of the artifacts based on a suitability comparison of the artifacts in context with user information in context. For example, the objective score of an artifact 125, 185 which has the same or overlapping context (e.g., for the artifact's project 123, a same or overlapping organization, geographic location, organization size, organization industry, organization regulations, public/private organization, and the like) as the user's project and/or provided preferences will be scaled upward. As another example, the score of an artifact that has been assessed 135 by a contributor with a same context (e.g., for the contributor assessing the artifact, a same or overlapping organization, geographic location, organization size, organization industry, organization regulations, public/private organization, and the like) as the user's project and/or preferences will also be scaled upward. Also, the objective score of an artifact 125, 185 which meets the user's preferences from the user's profile 155 as to frequency of use/update; how recently used/updated; minimum or maximum frequency of downloading and/or updating of an artifact (all as determined from the artifact's project's project log 131, 181); contributors of an artifact 127, 187; preferred sponsors of an artifact (as determined from the project 123, 183 information); standards for reputation of sponsor or author (as determined from the sponsor/author by reference to the reputation of sponsor/author 133, 141); minimum or maximum versions of an artifact (as determined from the project version ID); preferred or unacceptable licenses for an artifact (as determined from the project's license 129, 189); source code language (as determined from the project 123, 183 information); geographic requirements (as determined from the project's sponsor/contributor with reference to the organization information 163); and the like, can also be scaled upwardly in a degree that may vary depending on the nature and number of common features.

The objective scoring 101 and the subjective suitability comparison 107 are combined to provide scaled scores 193 that determine the recommended artifacts provided to the user. That is to say, those artifacts 125, 185 that have a scaled score of a certain threshold value, or alternatively a certain top percentage of all scaled scored artifacts (for example, the top 10%) may be provided to the user as recommended artifacts. In this manner, the score of a software artifact which has high evaluations by human users, highly reputable authors and sponsors, and high reliability as determined by NIST, and which therefore has a very high objective score, may be scaled down because of disparity in for example size, geography, and industry of the artifact's organization and user's organization, a very low review by a human user in the same industry as the user, and limited overlap of license terms. Such an artifact would likely not be recommended to a user.

An optional modification to this embodiment includes providing the user with a single artifact having the highest scaled score. A second optional modification includes providing information relating to the predominant factors resulting in particular scaled scores that place particular artifacts on a recommended list provided to the user. It should be noted that the data flows illustrated herein are by way of example to further enhance understanding of the principles discussed herein. Actual implementations can omit one or more portions of the data flows, and/or can include other data flows which are within the scope and spirit of the discussion herein.

Figure 2:
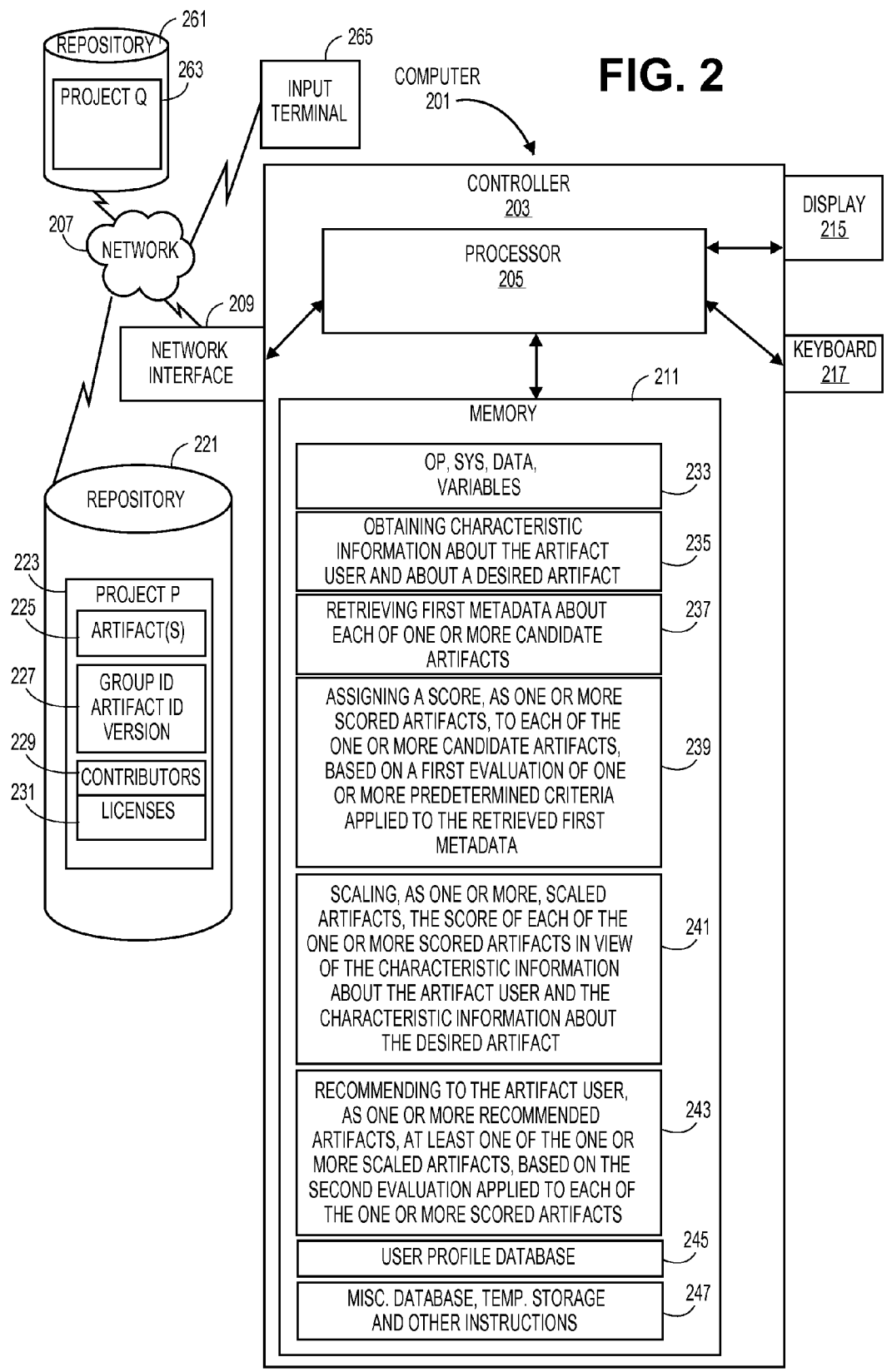
FIG. 2 is a diagram illustrating a computer system for recommending one or more recommended artifacts to an artifact user.

Referring now to FIG. 2, a diagram illustrating a computer system for recommending one or more artifacts to an artifact user will be discussed and described. The computer 201 may include one or more controllers 203, a processor 205, a network interface 209 for communication with a network 207, a memory 211, a display 215 (optional), and/or a user input device such as a keyboard 217. Alternatively, or in addition to the keyboard 217, a user input device may comprise one or more of various known input devices, such as a keypad, a computer mouse, a touchpad, a touch screen, a trackball, and/or a keyboard. The display 215 may present information to the user by way of a conventional liquid crystal display (LCD) or other visual display, and/or by way of a conventional audible device (e.g., a speaker) for playing out audible messages.

The processor 205 may comprise one or more microprocessors and/or one or more digital signal processors. The memory 211 may be coupled to the processor 205 and may comprise a read-only memory (ROM), a random-access memory (RAM), a programmable ROM (PROM), and/or an electrically erasable read-only memory (EEPROM). The memory 211 may include multiple memory locations for storing, among other things, an operating system, data and variables 233 for programs executed by the processor 205; computer programs for causing the processor to operate in connection with various functions such as: obtaining 235 characteristic information about an artifact user and characteristic information about a desired artifact; retrieving 237 first metadata about each of one or more candidate artifacts; assigning 239 a score, as one or more scored artifacts, to each of the one or more candidate artifacts, based on a first evaluation of one or more predetermined criteria applied to the retrieved first metadata; scaling, 241 as one or more scaled artifacts, the score of each of the one or more scored artifacts, based on a second evaluation of each of the one or more scored artifacts in view of the characteristic information about the artifact user and the characteristic information about the desired artifact; and recommending 243 to the artifact user, as one or more recommended artifacts, at least one of the one or more scaled artifacts, based on the second evaluation applied to each of the one or more scored artifacts. Responsive to manual signaling from the user input device represented by the keyboard 217, and in accordance with instructions stored in memory 211, and/or automatically upon receipt of certain information via the network interface 209, the processor 205 may direct the execution of the stored programs.

As mentioned above, the user input device may comprise one or more of various known input devices, such as the illustrated keyboard 217 and/or a pointing device, such as a mouse. The keyboard 217 may be supplemented or replaced with a scanner, card reader, or other data input device; and the pointing device may be a mouse, touch pad control device, track ball device, or any other type of pointing device. The display 215 is representative of a display that may present information to the user by way of a conventional liquid crystal display (LCD) or other visual display, and/or by way of a conventional audible device for playing out audible messages.

The computer 201 can access a repository 221, 261 on which is stored one or more projects, e.g., Project P 223 and Project Q 263. In the project P 223 are one or more artifacts and a Group ID, artifact ID, and version (collectively, "GAV"), here represented by one artifact 225 and its GAV 227. The project 223 also lists its contributors 229 and one or more licenses 231 that cover the artifacts in the project. The project 223 can also include a project log(not illustrated). Although the projects 221, 261 are illustrated as accessed over a network, they may be configured to be remotely or locally accessible from the computer 201, over a wired or wireless connection. An example of the repository 221 is Maven, available from Sonatype or Apache.

The processor 205 may be programmed for obtaining 235 characteristic information about an artifact user and characteristic information about a desired artifact. Characteristic information about the user can be obtained from a user profile which is input by prompting the user for information such as the organization to which the user belongs, project or projects to which the user belongs, and/or standards to apply for artifact selection. Characteristic information about a desired artifact, such as the intended use of the software artifact or artifact selection standards, can be expressly indicated in the user profile, but can also be inferred from the user's project in which the user participates. The user's project can be expressly indicated in the user profile, and/or can be inferred by scanning repositories to find out which projects 223, 263 lists the user as a contributor and/or which projects list the user's organization as a sponsor.

The processor 205 may be programmed for retrieving 237 first metadata about each of one or more candidate artifacts. Specifically, the processor may be programmed to retrieve metadata for a software artifact about project activity, security risk, or license information. For example, one or more artifacts 225 can be accessed in the repository 221. The information about the activity of the project 223, that the artifact is in, can be collected from the project log(not shown) within the artifact's project information at the repository 221. Information about the contributors, licenses, and the like for the project 223, which the artifact 225 is in, can be collected from the repository 221. Techniques are known for accessing this information from a repository 221. This summary of retrieved metadata is certainly not exhaustive, but is simply exemplary.

The processor 205 may be programmed for assigning 239 a score, as one or more scored artifacts, to each of the one or more candidate artifacts, based on a first evaluation of one or more predetermined criteria applied to the retrieved first metadata. Specifically, code quality metrics can be run against a software artifact or run available analysis tools to get information about how good and secure a software artifact is, all in accordance with conventionally available techniques. Scoring of an artifact can be correlated to how active an artifact is, as well as how recent the activity is. The security risk of an artifact can be obtained after being correlated from a publicized assessment of released software (as previously discussed). An artifact is less desirable if it has a known security risk, and can be even less desirable when the vulnerability is indicated as serious in the third party security information. The licenses 231 which apply to the artifact 225 are indicated in the project 223 to which the artifact belongs, and the more restrictive a license, generally the less desirable the software artifact.

The computer metrics discussed above can rate the software artifact with a low score of 20/100. However, human users (other than a user who may obtain the software artifact based on a recommendation according to the embodiments disclosed herein) that are satisfied with a software artifact can boost the objective score. However, the metrics discussed above do not reflect whether human users actually like and/or approve of a software artifact. In this regard, individuals with particular personal knowledge of an artifact may be willing to share the personal knowledge about the software artifacts (so-called "crowd-sourcing"). The quality of a particular reviews and shared knowledge can be determined from the known reputation of the author, and hence its influence on the objective score can be appropriately weighted according to the author's reputation. Open source systems use known techniques for calculating and storing reputations of authors.

As a further indication of human user approval (and/or disapproval) the activity of the artifact and/or its project can be obtained from the project log(not illustrated). The more activity of the artifact, the greater the likelihood that users are obtaining satisfactory results from using the artifact. Finally, there are conventional information sources which discuss software artifacts, which can be crawled and indexed and rendered into a schema used to generate objective scoring, e.g., machine generated or published information.

Other factors discussed herein can contribute to the objective scoring of an artifact, such as reputation of the project's sponsor (obtained by cross referencing the sponsor listed in the project information with sponsor reputations), with a better sponsor reputation resulting in a more desirable artifact. The reputation of the artifact's author (obtained by cross referencing the author listed in the project information with author reputation) is also a factor, with a better author reputation resulting in a more desirable artifact. Again, the above factors are not an exhaustive list, but are only exemplary factors.

It should be noted that much of this human provided data is obtained by prompting users (other than the current user) to provide feedback related to candidate artifacts. For example, users may provide metadata of community ranking specific to the software artifact 225. Users (through an interface) may be elicited to provide textual descriptions of artifacts, elicited to provide rankings of artifacts (e.g., numeric ranking, or up to five stars, or similar). Known techniques can be used to interact with a user to collect community rankings, although these techniques have not been used in connection with software artifacts 225. The human-provided metadata can be stored together with an indication of the author that provided the data.

To summarize how the processor 205 assigns a score to each of the one or more candidate artifacts, based on a first evaluation of one or more predetermined criteria applied to the retrieved first metadata, the processor uses both quantitative machine based analyses, including the use of metrics, and human-user based qualitative information as criteria by which to comprehensively evaluate and score the candidate artifacts. This results in a balanced objective scoring that is the same regardless any consideration of the particular user requesting the scoring. For example, measurements of the artifact 225 (as can be obtained via conventionally available applications such as a scan), with a better measurement resulting in a more desirable artifact, can also contribute to the objective scoring of an artifact. Additionally, human user feedback such as that which might be input in a review questionnaire can either offset or further add to the machine based objective score.

The processor 205 may be programmed for scaling 241, as one or more scaled artifacts, the score of each of the one or more scored artifacts, based on a second evaluation of each of the one or more scored artifacts in view of the characteristic information about the artifact user and the characteristic information about the desired artifact. As described above, user data can be obtained from a user profile which is input by prompting the user for information such as the organization to which the user belongs, the project or projects to which the user belongs, and/or standards to apply for artifact selection. The intended use of the software artifact can be expressly indicated in the user profile such as artifact selection standards listed therein, and/or can be inferred from the user's project in which the user participates. The user's project can be expressly indicated in the user profile, and/or can be inferred by scanning repositories to find out which project(s) 223, 263 lists the user as a contributor and/or which projects list the user's organization as a sponsor. Express or inferred properties can include, for example, minimum or maximum frequency of down loading and/or updating of an artifact, usual contributors, usual sponsors, reputation of sponsor or author, minimum or maximum versions of an artifact, licenses, source code language, geographic location, organization size, organization industry, organization regulations, public/private organization, and the like. User data can be stored as metadata as part of a user project, for example as seen in FIG. 1 as project Q 145.

The scores of the candidate artifacts are scaled upward, for example, where there is a greater overlap of properties of the software artifact 225 with the user's intended use. That is to say, the more suitable the artifact is with the intended use of the artifact by the user, the higher the scaling upward. Likewise, suitability is reduced when the artifact's express or inferred properties have less overlap with the user's intended use. This suitability analysis can be used to scale of the scores resulting from the objective evaluation of the candidate artifacts to provide a scaled score that may be recommended to the user if the score is high enough.

The processor 205 may be programmed to recommend 243 to the artifact user, as one or more recommended artifacts, at least one of the one or more scaled artifacts, based on the second evaluation applied to each of the one or more scored artifacts. Specifically, once a plurality of scaled scores are obtained, the user may be presented, through either the display 215 on the computer system 201, or on a display of a remote computer, one or more recommended artifacts. Additionally, there may be other means by which to inform the user of the one or more scaled artifacts that are recommended. For example, the computer system 201 may email a list of the recommended artifact to the user over the network 207. The presented list may be included in the body of the email or separately in an attachment. The attachment could be in the form of an Excel Spreadsheet, an Adobe Acrobat file, an MS Word table, or any other known file type. These examples should not be seen as limiting any manner known in the art for providing a recommendation list.

There may be a predetermined threshold score that a scaled score must meet in order for the respective artifact to be recommended as a recommended artifact. Alternatively, a scaled artifact may be required to be in a top percentage of all scored and scaled artifacts before the artifact can be recommended to the user. For example, the top 25% of all scored and scaled artifacts may be recommended to the user as a recommend artifact. It should be noted that in an alternative embodiment, only a single highest scaled score may be recommend to the user as a recommended artifact.

The memory 211 may be programmed with a database of user profiles 245. Here, the user profile database 245 is illustrated as being local to the computer 201. Alternatively, the user profile database can be provided remotely and/or distributed to two or more computers. A user profile in the database can store the information provided by interacting with the user, such as the name or unique identity of the organization to which the user belongs, the unique identity (e.g., GAV) or name of the project to which the user belongs, and/or userselectable standards to apply for artifact selection. In a variation, the user profile included in the user profile database 245 can point to one or more different user profiles to use in addition to or instead of the user profile. For example, a user profile of a line coder may point to the user profiles of the project lead and/or the organization's COO which can establish different minimum or maximum standards imposed on the line coder's selection of an artifact.

As will be understood in this field, besides the functions discussed above, the memory 211 can include other miscellaneous information in a miscellaneous database 247, along with the usual temporary storage and other instructions for other programs not considered herein.

The computer 201 can accommodate one or more disk drives or removable storage (not illustrated). Typically, these might be one or more of the following: a flash memory, a floppy disk drive, a hard disk drive, a CD ROM, a digital video disk, an optical disk, and/or a removable storage device such as a USB memory stick, variations and evolutions thereof. The number and type of drives and removable storage may vary, typically with different computer configurations. Disk drives may be options, and for space considerations, may be omitted from the computer system used in conjunction with the processes described herein. The computer may also include a CD ROM reader and CD recorder, which are interconnected by a bus along with other peripheral devices supported by the bus structure and protocol (not illustrated). The bus can serves as the main information highway interconnecting other components of the computer, and can be connected via an interface to the computer. A disk controller (not illustrated) can interface disk drives to the system bus. These may be internal or external. The processor 205, memory 211, a disk drive and/or removable storage medium are referred to as "computer-readable storage media" and provide non-transitory storage of computer programs and data.

It should be understood that FIG. 2 is described in connection with logical groupings of functions or resources. One or more of these logical groupings may be omitted from one or more embodiments. Likewise, functions may be grouped differently, combined, or augmented without parting from the scope. Similarly the present description may describe various databases or collections of data and information. One or more groupings of the data or information may be omitted, distributed, combined, or augmented, or provided locally and/or remotely without departing from the scope.

Figure 3:
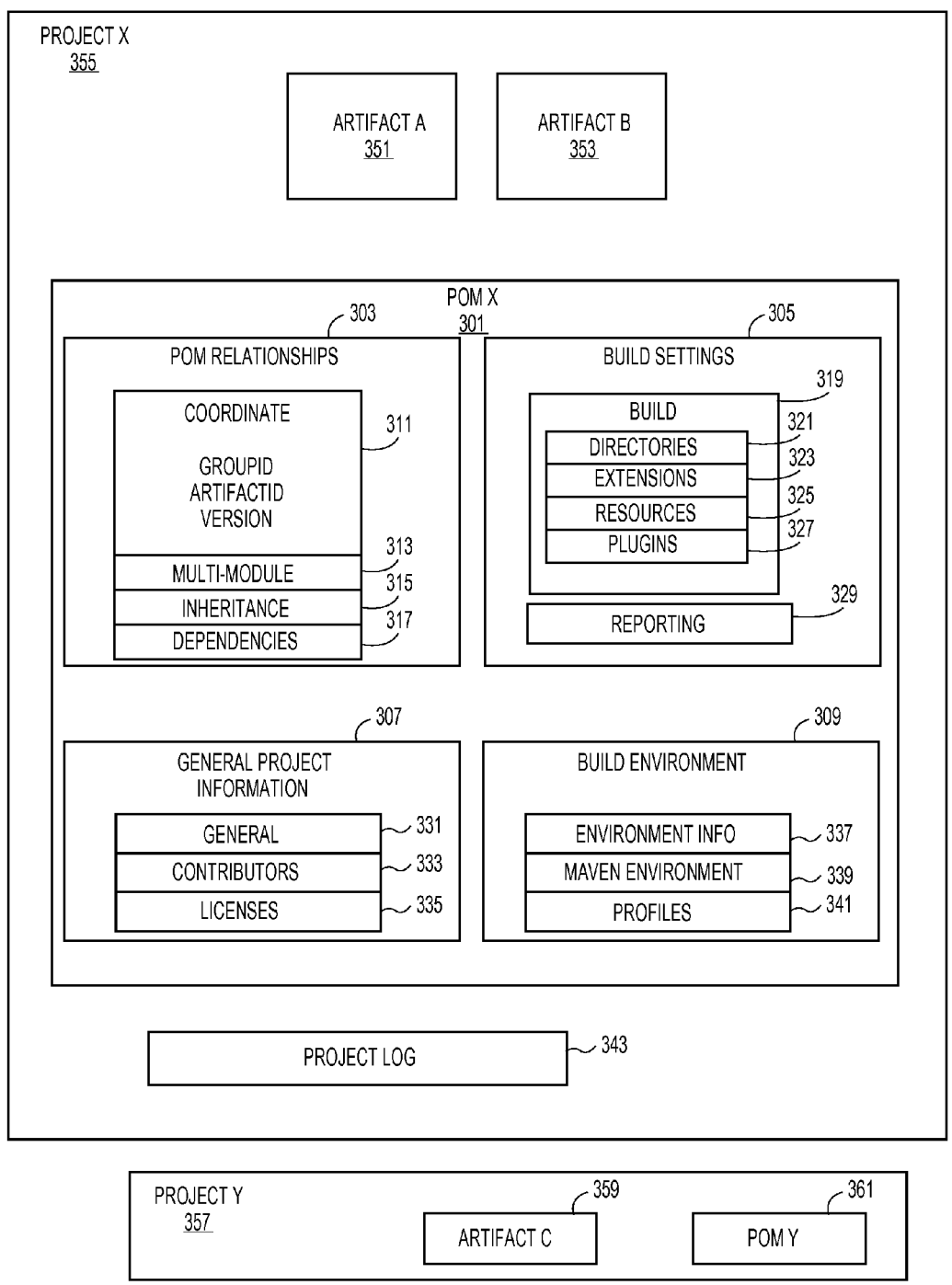
FIG. 3 is a block diagram illustrating a project object model.

Referring now to FIG. 3, a block diagram illustrating a project object model will be discussed and described. The project, e.g., project X 355 includes one or more artifacts (here represented by Artifacts A and B 351, 353), the project log 343 for Project X, and metadata for the project X (here represented by POM X 301) that identifies project information such as contributors 333 and licenses 335. Project X 355 is the type of project that could be found, for example, as Project P 123 or Project R 183 in FIG. 1; and as Project Q 263 or Project P 223 in FIG. 2.

FIG. 3 further illustrates a known Maven software (available from Sonatype, Inc.) project object model, which provides a highly structured handling of projects and artifacts; a discussion of relevant portions is provided while other less relevant and known information is omitted. Maven (available from Sonatype) is a build management tool that comprises a project object model ("POM"), a set of standards, a project lifecycle, a dependency management system, and logic for executing plugin goals at defined phases in a lifecycle.

A "Project Object Model" (POM), e.g., POM X 301 is a file provided for a project 355 that describes configures and customizes an application and is associated with one or more artifacts by being included in the same directory as one or more artifacts. In different build tools or project management tools, the POM 301 is a file included in a project, e.g., project X 355, which includes one or more artifacts (represented by artifact A and artifact B 351, 353); the POM can be a file with a pre-determined name: a Maven pom.xml file, a GNU Makefile, or an Ant build.xml file. The POM file is typically targeted to Java applications, building JAR artifacts, C# sources, or the like. A software artifact can be associated with a POM in alternative ways, for example, by including a link or identification of the associated POM.

The POM 301 can contain description data and configuration data: POM relationships 303, build setting 305, general project information 307, and build environment 309. These are discussed in more detail. General project information 307 includes general data 331 (project's name, the URL for a project, the sponsoring organization), a list of developers and contributors 333, and the license (or identifiers of licenses) for the project 355.

The build settings 305 for the project 355 customize the behavior of a build 319 by specifying location of directories 321, extensions 323, resources 325 and plugins 327. Also, the build settings 305 can specify reporting 329 to be used for the POM 301. The build environment 309 comprises settings and profiles that can be activated when the software comprising the artifacts 351 is built for use in different environments. For example, during development the built software is deployed to a development server, whereas in production developers the built software is deployed to a production server. This example provides build environment information 337, Maven environment information 339, and profiles 341 to be used in different builds. Techniques for executing a build of software are known.

The POM relationships 303 include POM coordinates 311 that specify a group ID), an artifact ID, and a version number for the project 355 and for the POM 301. In the conventional Maven system, group ID, artifact ID and version (GAV) uniquely identify each artifact. The group ID is meant to identify the individual or organization that published the artifact. The artifact ID uniquely identifies an artifact for the Group, and in accordance with known techniques indicates what functionality the artifact is addressed to; artifact IDs need not be unique for different groups. The version is the temporal axis for how an artifact changes in accordance with known techniques, e.g., Version 1.0 is least mature, and Version 8.2.3 is more mature. Collectively, the group ID, artifact ID and version number are sometimes referred to herein as the "GAV", "Maven coordinate" or "GAV coordinate". The GAV uniquely identifies an artifact and allows its dependencies and relationship to other artifacts to be tracked. The use of the GAV disambiguates amongst artifacts across various domains of different groups.

The POM relationships 303 also include multi-module information 313, inheritance information 315, and dependencies information 317.

Since each artifact 351, 353 is associated with the metadata, i.e., the information in the POM 301, the user can be provided with very targeted information. For example, a user can be informed that a particular artifact has not been updated for a long time or has security vulnerabilities to be fixed. The POM 301 can be accessed to aid in scoring artifacts 351, 353 as described above. As mentioned above, the POM as used in Maven is discussed in "MAVEN: The Complete Reference Guide", Edition 8 (2010). In a well-written POM, there is a block for "description," "project", "URL", "License", "Issue tracking", "author list" and the like. Known techniques can be used to construct a POM.

A project, e.g., project X 355 can have a parent, e.g., project Y 357. The parent project Y 357 includes other artifacts (here represented by Artifact C 359), the project log(not illustrated) for Project Y, and metadata for the project Y (here represented by POM Y 361) that identifies project information such as contributors and licenses. Values which are not specified in the POM in a child project can inherit values from the POM of a parent project, e.g., when general project information 307 is not specified in the POM X 301 of Project X 355, the project X 355 can inherit the general project information specified in the POM Y 361 of the parent project Y 357

Also included in a project X 355 is a project log 343. The project log 343 can perform known functions, such as recording source code check-in, who checked it in, why it was checked-in; recording source code check-out, who checked it out, why it was checked-out; recording update of an artifact, who updated it, from what sponsor, and why it was updated; recording a download of an artifact from the project, who downloaded it, and to where; tracking issues such as bugs and related fixes specifying artifacts which were fixed); and similar. Any and all of the foregoing are considered to be an activity. Typically the log includes a time stamp for each activity. This information may be divided between more than one file, which together can be considered to be a project log. Techniques for maintaining a project log are known in the industry.

A simple example of a POM is as follows:

```
<project>
    <!-- model version is 4.0.0 for Maven 2.x POMs -->
    <modelVersion>4.0.0</modelVersion>
    <!-- project coordinates, i.e. a group of values which uniquely
        identify this project -->
    <groupId>com.mycompany.app</groupId>
    <artifactId>my-app</artifactId>
    <version>1.0</version>
    <!-- library dependencies -->
    <dependencies>
        <dependency>
            <!-- coordinates of the required library -->
            <groupId>junit</groupId>
            <artifactId>junit</artifactId>
            <version>3.8.1</version>
            <!-- this dependency is only used for running and compiling
                tests -->
            <scope>test</scope>
        </dependency>
    </dependencies>
</project>
```

Referring now to FIG. 4, a diagram illustrating an artifact recommendation user profile form that is used to obtain characteristic information about an artifact user and characteristic information about a desired artifact, is discussed and described. The profile form 400 is presented electronically to the user and includes, for example text-input boxes 402, 415, 406, 408, 410, and 412a-412h for accepting text from the user. The form 400 could either be displayed to the user on a display such as display 215 of a central computer system such as system 201, or could be displayed on a remote computer accessed through a network such as network 207. Please see FIG. 2.

It should be noted that the exact technology used to electrically display form 400 is not specified herein. It could be any means known in the art for accepting text input from a user in response to prompts. It should also be noted that other forms of accepting input from a user, other than text-input boxes, could also be used in response to system inquiries. Specifically, radio buttons, check boxes, selection boxes, and all other mark-up language mechanisms can be used in various situations.

FIG. 4 specifically illustrates several basic questions/directives (hereinafter, simply "question") that help establish a user profile. Specifically question 401 asks the user for his name. Text-input box 402 is provided for the answer. Question 403 asks the user to identify his status as a decision maker with respect to artifact acquisition. Question 404 instructs the user to describe his job title in the provided input-text box 415.

Question 405 prompts the user to identify the organization he is affiliated with, and input-text box 406 is provided for the answer. Question 407 asks the user to identify where additional information about his organization can electronically be found, and box 408 is provided for the answer. Question 409 ask the user to identify any projects that the user or the user's organization are associated with. Input-text box 410 is provided for the answer.

Question 411 instructs the user to enter pertinent preferences with respect to a desired artifact. Input text box 412a allows the user to enter a preferred geographic region. Input text box 412c allows the user to enter a preferred download frequency. Input text box 412d allows the user to enter a preferred update frequency. Input text box 412e allows the user to enter preferred sponsors. Input text box 412f allows the user to enter preferred contributors. Input text box 412g allows the users to enter a preferred license characteristic, and input text box 412h allows the user to enter a preferred security characteristic. The final question on this exemplary user form 400 is an inquiry 413 as to whether the user would like to have other preferences inferred (as described above) from various electronic sources. The user can decide yes or no.

It should be emphasized that the form 400 is exemplary, and substantial variations of the form could be used to obtain user information. For example drop down menus, radio buttons, and/or other similar conventional GU representations can be used. It should be understood that the specific information collected through the use of form 400 is not in any, way exhaustive as to user characteristic information and artifact characteristic information that could be obtained from a user.

Referring now to FIG. 5, a flow chart illustrating a procedure for recommending one or more artifacts to an artifact user will be discussed and described. The procedure can advantageously be implemented on, for example, a processor of a controller, described in connection with FIG. 2 or other apparatus appropriately arranged. The procedure 501 for recommending one or more artifacts to an artifact user includes obtaining 503 characteristic information about the artifact user and characteristic information about a desired artifact. As described above, obtaining the mentioned characteristic information of the artifact user may include retrieving information from the user via input from a user. Additionally, information about the user and about the desired artifact can be obtained by inferring user preferences, as described in detail above.

The procedure 501 also includes retrieving 505 metadata about each of one or more candidate artifacts. As described in much more detail above, the metadata may take the form of (1) derived data, (2) community/contributed data, and (3) third party data. The metadata is retrieved through known techniques as described above.

The procedure 501 also includes assigning 507 a score, as one or more scored artifacts, to each of the one or more candidate artifacts, based on a first evaluation of one or more predetermined criteria applied to the retrieved first metadata.

As described above, objective evaluations are made on candidate artifacts based on machine based analyses and based on human user assessments. The objective evaluation process is described in much greater detail above, and is not repeated here.

The procedure 501 further includes scaling 509, as one or more scaled artifacts, the score of each of the one or more scored artifacts, based on a second evaluation of each of the one or more scored artifacts in view of the characteristic information about the artifact user and the characteristic information about the desired artifact. Scaling 509 includes making a suitability determination based on overlap of artifact contexts with users contexts. This process is described in detail above.

The procedure 501 lastly includes recommending 511 to the artifact user at least one of the one or more scaled artifacts, based on the second evaluation applied to each of the one or more scored artifacts. Recommending artifacts may include presenting artifacts that have scaled scores that are in a top percentile of all scores or may also include recommending every artifact that has a scaled scored that exceeds a particular threshold. The procedure 501 then ends 513.

The discussion herein refers to "metadata." Metadata can be collected from various, disparate sources, whether from the artifacts stored in a repository itself (e.g., last modified timestamp on the artifact file), the project log for the project which includes the artifact, from publicly available third-party sources (e.g. cve.mitre.org, who publishes vulnerability information), or from the outputs of metric processes that can be run on the artifacts that are housed in the repository (e.g. a file scanner looks for binary incompatibilities between an artifact's current version and prior version(s)).

Software projects, and more particularly open source software projects, conventionally collect information about project "activity," and/or artifact "activity," which reflects whether an artifact is kept up to date (i.e., recently updated), whether it is being actively developed (i.e., lots of recent activity). This is particularly true where the software source code is open source, which controls use of artifacts so that the project log must reflect the activity.

Security risk of a software artifact is referred to herein, and generally encompasses software vulnerabilities and security. The Mitre CVE (Common Vulnerabilities and Exposures) list and NIST NVD (National Vulnerability Database) and other organizations conventionally provide text information about vulnerabilities and security of commercial software applications. However, the CVE list and NVD database indicate commercial software application names and versions or version ranges which do not readily map to software artifact coordinates. Furthermore, the CVE and NVD rating of vulnerabilities is based on the seriousness of the vulnerability.

Licenses are also referred to herein. Well known in the open source field is that a license can be associated with an artifact. The method or system can collect the identity of the license or the content of the license, which is listed for example in the project such as in the POM associated with the artifact. The license further can be normalized to indicate permitted and prohibited activities. (There are several pre-determined open-source licenses in common use as well as variations thereof, as well as some customized licenses.) The license (which permits or prohibits certain activities) can be scored against what the user intends to do with the software, as further discussed herein.

The open source world tends to make available high-level descriptions as well as low-level walk through guides. This documentation can be conventionally published in association with the open source code software artifacts. Keywords can be extracted from the documentation and can be useful for searching and categorization and the like since they tend to describe how code is used, and what it can be used with.

The detailed descriptions which appear above may be presented in terms of program procedures executed on a computer or network of computers. These procedural descriptions and representations herein are the means used by those skilled in the art to most effectively convey the substance of their work to others skilled in the art.

Further, an embodiment has been discussed in certain examples as if it is made available by a provider to a single customer with a single site. An embodiment may be used by numerous users, if preferred, and the users can be at one or more sites.

The system used in connection herewith may rely on the integration of various components including, as appropriate and/or if desired, hardware and software servers, applications software, database engines, server area networks, firewall and SSL security, production back-up systems, and/or applications interface software.

A procedure is generally conceived to be a self-consistent sequence of steps leading to a desired result. These steps are those requiring physical manipulations of physical quantities. Usually, though not necessarily, these quantities take the form of electrical or magnetic signals capable of being stored on non-transitory computer-readable media, transferred, combined, compared and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to these quantities.

Further, the manipulations performed are often referred to in terms such as adding or comparing, which are commonly associated with mental operations performed by a human operator. While the present invention contemplates the use of an operator to access the invention, a human operator is not necessary, or desirable in most cases, to perform the actual functions described herein; the operations are machine operations.

Various computers or computer systems may be programmed with programs written in accordance with the teachings herein, or it may prove more convenient to construct a more specialized apparatus to perform the required method steps. The required structure for a variety of these machines will appear from the description given herein.

Furthermore, the communication networks of interest include those that transmit information in packets, for example, those known as packet switching networks that transmit data in the form of packets, where messages can be divided into packets before transmission, the packets are transmitted, and the packets are routed over network infrastructure devices to a destination where the packets are recompiled into the message. Such networks include, by way of example, the Internet, intranets, local area networks (LAN), wireless LANs (WLAN), wide area networks (WAN), and others. Protocols supporting communication networks that utilize packets include one or more of various networking protocols, such as TCP/IP (Transmission Control Protocol/Internet Protocol), Ethernet, X.25, Frame Relay, ATM (Asynchronous Transfer Mode), IEEE 802.11, UDP/UP (Universal Datagram Protocol/Universal Protocol), IPX/SPX (Inter-Packet Exchange/Sequential Packet Exchange), Net BIOS (Network Basic Input Output System), GPRS (general packet radio service), I-mode and other wireless application protocols, and/or other protocol structures, and variants and evolutions thereof. Such networks can provide wireless communications capability and/or utilize wireline connections such as cable and/or a connector, or similar.

This disclosure is intended to explain how to fashion and use various embodiments in accordance with the invention rather than to limit the true, intended, and fair scope and spirit thereof. The invention is defined solely by the appended claims, as they may be amended during the pendency of this application for patent, and all equivalents thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A method, implemented in a computer, for recommending at least one artifact to an artifact user, comprising:
   obtaining, by the computer, user characteristic information reflecting preferences, particular to the artifact user, as to a desired artifact;
   obtaining, by the computer, first metadata about each of one or more candidate artifacts;
   scoring, by the computer, as one or more scored artifacts, each of the one or more candidate artifacts by evaluating one or more criteria, not particular to the artifact user, applied to the first metadata;
   scaling, by the computer, as one or more scaled artifacts, a score of each of the one or more scored artifacts, by evaluating the suitability of each of the one or more scored artifacts in view of the user characteristic information; and
   recommending, by the computer, to the artifact user at least one artifact from among the one or more scaled artifacts based on a scaled score of the at least one artifact, wherein
   the first metadata about each of the one or more candidate artifacts includes:
     derived data, which is activity information acquired from project logs;
     community data which are reviews, rankings, categorization, and tagging provided by human users; and
     third party data.

2. The method of claim 1, wherein:
   the retrieved first metadata about each of one or more candidate artifacts relates to at least one of the following:
     activity information of a project to which each of the one or more candidate artifacts belongs;
     security and vulnerability information about each of the one or more candidate artifacts;
     licensing information about each of the one or more candidate artifacts;
     user provided quality information of each of the one or more candidate artifacts; and
     identifying and categorization information of each of the one or more candidate artifacts.

3. The method of claim 1, wherein:
   the preferences as to a desired artifact relate to one or more the following:
     whether an artifact was designed for an industry in which the artifact user is engaged in commerce,
     whether an artifact is widely used in a geographical region in which the artifact user is physically disposed,
     whether an artifact is downloaded at greater than a particular frequency,
     whether an artifact is sponsored by a preferred sponsor,
     whether an artifact was designed or updated by one or more preferred contributors, and
     whether an artifact is written in a preferred source code language.

4. The method of claim 1, wherein:
   the obtaining the user characteristic information reflecting preferences particular to the artifact user includes:
     prompting, by the computer, the artifact user to provide at least a portion of the user characteristic information, and
     receiving from the artifact user, by the computer, the at least a portion of the user characteristic information in response to the prompting.

5. The method of claim 1, wherein:
   the obtaining the user characteristic information reflecting preferences particular to the artifact user includes inferring preferences from any projects in which the artifact user participates.

6. The method according to claim 1, wherein:
   the obtaining the first metadata about each of one or more candidate artifacts includes retrieving the first metadata from one or more projects in one or more repositories.

7. A non-transitory computer-readable medium comprising instructions for execution by a computer, the instructions including a method for recommending at least one artifact to an artifact user, comprising:
   obtaining user characteristic information reflecting preferences, particular to the artifact user, as to a desired artifact;
   obtaining first metadata about each of one or more candidate artifacts;
   scoring as one or more scored artifacts, each of the one or more candidate artifacts by evaluating one or more criteria, not particular to the artifact user, applied to the first metadata;
   scaling as one or more scaled artifacts, a score of each of the one or more scored artifacts, by evaluating the suitability of each of the one or more scored artifacts in view of the user characteristic information; and
   recommending to the artifact user at least one artifact from among the one or more scaled artifacts based on a scaled score of the at least one artifact, wherein
   the first metadata about each of the one or more candidate artifacts includes:
     derived data, which is activity information acquired from project logs;
     community data which are reviews, rankings, categorization, and tagging provided by human users; and
     third party data.

8. The non-transitory computer-readable medium according to claim 7, wherein:
   the retrieved first metadata about each of one or more candidate artifacts relates to at least one of the following:
     activity information of a project to which each of the one or more candidate artifacts belongs;
     security and vulnerability information about each of the one or more candidate artifacts;
     licensing information about each of the one or more candidate artifacts;

user provided quality information of each of the one or more candidate artifacts; and
identifying and categorization information of each of the one or more candidate artifacts.

9. The non-transitory computer-readable medium according to claim 7, wherein:
the preferences as to a desired artifact relate to one or more the following:
whether an artifact was designed for an industry in which the artifact user is engaged in commerce,
whether an artifact is widely used in a geographical region in which the artifact user is physically disposed,
whether an artifact is downloaded at greater than a particular frequency,
whether an artifact is sponsored by a preferred sponsor,
whether an artifact was designed or updated by one or more preferred contributors, and
whether an artifact is written in a preferred source code language.

10. The non-transitory computer-readable medium according to claim 7, wherein in the method:
the obtaining the user characteristic information reflecting preferences particular to the artifact user includes:
prompting the artifact user to provide at least a portion of the user characteristic information, and
receiving from the artifact user the at least a portion of the user characteristic information in response to the prompting.

11. The non-transitory computer-readable medium according to claim 7, wherein in the method:
the obtaining the user characteristic information reflecting preferences particular to the artifact user includes inferring preferences from any projects in which the artifact user participates.

12. The non-transitory computer-readable medium according to claim 7, wherein in the method:
the obtaining the first metadata about each of one or more candidate artifacts includes retrieving the first metadata from one or more projects in one or more repositories.

13. A computer system configured for recommending at least one artifact to an artifact user, comprising:
a transceiver operable to transmit and receive communications over at least a portion of a network; and
a processor cooperatively operable with the transceiver, and configured to facilitate:
obtaining user characteristic information reflecting preferences, particular to the artifact user, as to a desired artifact;
obtaining first metadata about each of one or more candidate artifacts;
scoring as one or more scored artifacts, each of the one or more candidate artifacts by evaluating one or more criteria, not particular to the artifact user, applied to the first metadata;
scaling as one or more scaled artifacts, a score of each of the one or more scored artifacts, by evaluating the suitability of each of the one or more scored artifacts in view of the user characteristic information; and
recommending to the artifact user at least one artifact from among the one or more scaled artifacts based on a scaled score of the at least one artifact, wherein
the first metadata about each of the one or more candidate artifacts includes:
derived data, which is activity information acquired from project logs;
community data which are reviews, rankings, categorization, and tagging provided by human users; and
third party data.

14. The computer system according to claim 13, wherein:
the retrieved first metadata about each of one or more candidate artifacts relates to at least one of the following:
activity information of a project to which each of the one or more candidate artifacts belongs;
security and vulnerability information about each of the one or more candidate artifacts;
licensing information about each of the one or more candidate artifacts;
user provided quality information of each of the one or more candidate artifacts; and
identifying and categorization information of each of the one or more candidate artifacts.

15. The computer system according to claim 13, wherein:
the preferences as to a desired artifact relate to one or more the following:
whether an artifact was designed for an industry in which the artifact user is engaged in commerce,
whether an artifact is widely used in a geographical region in which the artifact user is physically disposed,
whether an artifact is downloaded at greater than a particular frequency,
whether an artifact is sponsored by a preferred sponsor,
whether an artifact was designed or updated by one or more preferred contributors, and
whether an artifact is written in a preferred source code language.

16. The computer system according to claim 13, wherein:
the obtaining the user characteristic information reflecting preferences particular to the artifact user includes:
prompting the artifact user to provide at least a portion of the user characteristic information, and
receiving from the artifact user the at least a portion of the user characteristic information in response to the prompting.

17. The computer system according to claim 13, wherein:
the obtaining the user characteristic information reflecting preferences particular to the artifact user includes inferring preferences from any projects in which the artifact user participates.

18. The non-transitory computer-readable medium according to claim 13, wherein in the method:
the obtaining the first metadata about each of one or more candidate artifacts includes retrieving the first metadata from one or more projects in one or more repositories.

* * * * *